United States Patent [19]

Hillis

[11] Patent Number: 5,113,510

[45] Date of Patent: May 12, 1992

[54] METHOD AND APPARATUS FOR OPERATING A CACHE MEMORY IN A MULTI-PROCESSOR

[75] Inventor: W. Daniel Hillis, Brookline, Mass.

[73] Assignee: Thinking Machines Corporation, Cambridge, Mass.

[21] Appl. No.: 136,580

[22] Filed: Dec. 22, 1987

[51] Int. Cl.⁵ .............................................. G06F 13/00
[52] U.S. Cl. ................................... 395/425; 364/243; 364/243.44; 364/246.12
[58] Field of Search ... 364/200 MS File, 900 MS File

[56] References Cited

U.S. PATENT DOCUMENTS

| | | | |
|---|---|---|---|
| 4,228,503 | 10/1980 | Waite et al. | 364/200 |
| 4,400,770 | 8/1983 | Chan et al. | 364/200 |
| 4,410,944 | 10/1983 | Kronies | 364/200 |
| 4,442,487 | 4/1984 | Fletcher et al. | 364/200 |
| 4,558,413 | 12/1985 | Schmidt et al. | 364/200 |
| 4,616,310 | 10/1986 | Dill et al. | 364/200 |
| 4,654,819 | 3/1987 | Stiffler et al. | 364/200 |
| 4,695,951 | 9/1987 | Hooker et al. | 364/200 |
| 4,843,542 | 6/1989 | Dashiell et al. | 364/200 |

Primary Examiner—Michael R. Fleming
Assistant Examiner—D. Chun
Attorney, Agent, or Firm—Pennie & Edmonds

[57] ABSTRACT

A computer system having a plurality of processors with each processor having associated therewith a cache memory is disclosed. When it becomes necessary for a processor to update its cache with a block of data from main memory, such a block of data is simultaneously loaded into each appropriate cache. Thus, each processor subsequently requiring such updated block of data may retrieve the block from its own cache, and not be required to access main memory.

15 Claims, 4 Drawing Sheets

METHOD AND APPARATUS FOR OPERATING A CACHE MEMORY IN A MULTI-PROCESSOR

BACKGROUND OF THE INVENTION

This relates to the operation of cache memory in multi-processor computing units. Extensive description of cache memories may be found in A. J. Smith "Cache Memories" *Computing Surveys*, Vol. 14, No. 3, pp. 473-530 (September 1982); in K. Hwang and F. A. Briggs, *Computer Architecture and Parallel Processing*, pp. 98-118, (McGraw-Hill, 1984); and in A. J. Smith, "Cache Memory Design: An Evolving Art", *IEEE Spectrum*, Vol. 24, No. 12, pp. 10-44 (December 1987), which are incorporated herein by reference.

A cache memory is a small, high-speed buffer memory inserted between the processor and main memory of a computer and as close to the processor as possible. The cache memory duplicates and temporarily holds portions of the contents of main memory which are currently in use or expected to be in use by the processor. Additionally, a cache memory may be inserted between main memory and mass storage.

The advantage of cache memory lies in its access time, which is generally much less than that of main memory, illustratively five to ten times less. A cache memory thus permits an associated processor to spend substantially less time waiting for instructions and operands to be fetched and/or stored, permitting a much decreased effective memory access time and resulting in an overall increase in efficiency. Illustrative memory access times for typical large, high-speed computers such as the Amdahl 580 and IBM 3090 are 200 to 500 nanoseconds for main memory and 20 to 50 nanoseconds for cache memory. The advantages obtained from use of cache memory similarly exist in medium and small computers.

Data in cache memory is arranged in the form of a plurality of block frames or lines, with a single block frame or line generally being of the same size as a block of main memory. The optimal size of a block frame, i.e., the size yielding the lowest average delay per memory reference, depends largely on cache size and access time parameters. By way of illustration, a computer system may have a cache memory block frame size of four bytes for a small 32 byte cache up to 128 bytes for a large 128 kilobyte cache. Main memory will be much larger. When it becomes necessary to update a cache with data from main memory, data within a block frame or a plurality of block frames of the cache is replaced with data from a block or blocks of the main memory.

Unfortunately, neither the computer nor the programmer can anticipate all of the data to be used presently or in the near future and therefore can not provide ideal data to the cache. Furthermore, not all data to be used in a current process will necessarily fit within a cache. Such considerations give rise to the concept of a "hit" and conversely, a "miss". A hit is produced when a processor references data contained within a cache while a miss results when a processor references data not contained within a cache. In the case of a miss, the data must be accessed from main memory, provided to the cache, and then provided to the processor. Such referenced data, whether ultimately producing a hit (referenced data within cache) or a miss (referenced data in main memory only), is known as a target.

The effectiveness of the cache is measured primarily by the hit ratio "h", i.e., the fraction of targets which produce a hit, or its complement the miss ratio (1-h), as well as the mean time required to access the target if a hit occurs. The design of a computer system having a cache involves minimization of the miss ratio as well as minimization of the mean access time associated with a hit. However, in addition to the primary considerations of low miss ratios and low access times for a hit, secondary considerations should be taken into account in the design of any system incorporating a cache. Such secondary considerations include the following: reduction of main-memory access time upon the occurrence of a miss; reduction of the total information demanded in a multi-processor system so as to reduce queues at main memory; and elimination of any cache cycles lost in maintaining data coherency among multi-processor caches.

Numerous tradeoffs are encountered in any attempt to optimize the above-mentioned considerations. For example, line size, cache size, the degree of associativity, real versus virtual addressing of the cache, when to update main memory, the number of caches and the type of priority scheme among caches must all be determined.

More specifically, the line size affects the amount of delay from cache misses as well as the miss ratio. For example, as the line size increases from a minimum, the miss ratio will at first decrease due to an increased amount of data being fetched from main memory with each miss. However, as the line size further increases, the miss ratio will increase as the probability of needing the newly fetched data becomes less than the probability of reusing the information which was replaced.

The line size also affects the percentage of cache memory which can be dedicated to information storage as distinguished from address storage. For example, a cache utilizing a 64 byte line with a two byte address can store significantly more information than can a cache utilizing a 6 byte line with a two byte address. Additional considerations relate to longer queues and delays at the memory interface associated with longer lines, I/O overrun, the frequency of line crossers (memory references spanning the boundary between two cache lines) and the frequency of page crossers (memory references spanning the boundary between two pages).

Cache size, similar to line size, affects the miss ratio, with a larger cache having a lower miss ratio. However, as cache size is increased, rise times are also increased, thus resulting in large caches which are slightly slower than the smaller caches. Additionally, larger caches are more costly, require larger integrated circuit chips and correspondingly larger circuit board area, and require more power and therefore cooling.

The degree of associativity also affects the miss ratio and cache performance. Associativity relates to the number of information elements per set in a cache. Set associative caches map an address into a set and search associatively within the set for the correct line. A fully associative cache has only one set. A direct mapped cache 20 has only one information element per set. Increasing the number of elements per set generally decreases the miss ratio. For example, a set size of two elements is significantly better than direct mapping; and a set size of four elements is better yet, although only by a small margin. However, increasing associativity not only produces additional delays, but is costly in both a monetary sense and the sense of silicon area requirements. In general, a large cache already having a low miss ratio will benefit more from short access times associated with direct mapping, while a small cache having a higher miss ratio will benefit more from a set associative cache.

When to update main memory also affects system operation. Information in a cache that has been modified by a CPU must eventually replace the corresponding stale information in main memory. Known methods to perform in such updating include write-through, in which the information in main memory is updated immediately as it is modified, and copy-back, in which the information in main memory is only updated when the line containing the corresponding modified information in the cache is replaced. See for example, L. M. Censier and P. Feautrier, "A New Solution to Coherence Problems in Multicache Systems", IEEE Transactions on Computers, Vol. C-27, No. 12, p.1112 (December 1978); M. Dubois and F. A. Briggs, "Effects of Cache Coherency in Multiprocessors", IEEE Transactions on Computers, Vol. C-31, No. 11, p.1083 (November 1982); A. Wilson, "Hierarchical Cache/Bus Architecture for Shared Memory Multiprocessors" (Encore Computer Corp., ETR-86-006 1986). Although write-through is generally simpler and more reliable, it generates substantial memory traffic.

The degree of success of a cache memory is attributed to, inter alia, the property of "locality". Locality has temporal as well as spatial components. Over short periods of time, a program generally distributes its memory references non-uniformly over its memory address space. Furthermore, the specific portions of the address space which are addressed tend to remain largely the same for long periods of time. Temporal locality relates to the phenomenon that data which will be required in a relatively short period of time is probably in use at the present time. Temporal locality is especially prevalent in scenarios in which both instructions and data, i.e., operands, are reused. Spatial locality relates to the phenomenon that portions of the address space which are presently in use generally consist of a relatively small number of individually contiguous segments of that address space. In other words, the loci of reference of the program in the near future are likely to be near the current loci of reference. Spatial locality is especially prevalent in scenarios in which related data items exist such as arrays and variables since they are typically stored together, and also scenarios in which instructions are executed sequentially, which is generally true. Thus, the cache which contains data (instructions and operands) that has recently been used is likely to also contain data that will be required in a short period of time.

A significant factor affecting efficiency of computer systems having cache memory lies in the type of block frame replacement method utilized to replace block frames in the cache with blocks from main memory. Such a block-by-block replacement is necessitated whenever a miss is encountered. Not only is a fetch from main memory necessary, but a decision must be made as to which of the block frames in a cache is to be deleted and replaced by a block of main memory. Numerous block replacement algorithms have been proposed to intelligently choose which block frame is to be replaced. Illustrative of such block replacement algorithms are the random (RAND), first-in, first-out (FIFO) and least recently used (LRU) methods. Block replacement algorithms generally are implemented entirely in hardware since they must execute with high speed so as not to adversely affect processor speed.

RAND replaces a randomly chosen block frame of the cache upon the occurrence of a miss. FIFO replaces the time-wise longest resident block frame of the cache upon the occurrence of a miss. LRU replaces the least recently referenced resident block frame of the cache upon the occurrence of a miss. Although LRU is generally the most efficient, FIFO is often used in the smaller computers due to cost considerations. For a detailed analysis of an LRU implementation, attention is directed to "Computing Surveys", Vol. 14, No. 3, September 1982, pp. 498-500.

The same advantage of reduced memory access time that prompts the use of cache memories in a single processor system is also available in multi-processor systems. However, in such systems the use of different data streams and conventional block frame replacement algorithms almost inevitably creates a situation in which the contents of the cache memories of the different processors are all different. In such circumstances, even if the miss ratio at each cache remains within normal limits, the demands made on main memory and its output communication channel to the cache memories can be severe. As a result, average memory access time can be degraded or extraordinary measures must be taken to enhance the throughput (or bandwidth) of the main memory and its output communication channel.

These problems are especially acute in computers where large numbers of parallel processors are operated together in processor arrays. Several such computers are commercially available. Of particular interest is the Connection Machine (Reg. TM) computer made by the present assignee, Thinking Machines, Inc. of Cambridge, Mass. This computer is described more fully in U.S. Pat. No. 4,598,400, which is incorporated herein by reference. The Connection Machine Computer system comprises a central computer, a microcontroller, and an array of as many as 65,536 parallel processors in presently available embodiments. The central computer may be a suitably programmed commercially available computer such as a Symbolics 3600-series LISP Machine. The microcontroller is an instruction sequencer of conventional design for generating a sequence of instructions that are applied to the array of parallel processors by means of a thirty-two bit parallel bus.

Numerous techniques are available for interconnecting the processors of a multi-processor system to a shared memory. These include a shared bus connecting the shared memory to each processor, a hierarchical bus such as that disclosed in the above-referenced Wilson paper and numerous types of interconnection networks such as those described in C. Wu and T. Feng, *Tutorial: Interconnection Networks For Parallel and Distributed Processing* (IEEE 1984).

SUMMARY OF THE INVENTION

In the present invention, many of the problems of updating cache memories in a multi-processor embodiment are eliminated by revising the update strategy used to provide requested data from main memory to the cache memory. In particular, in the prior art each cache memory operates independently of all the other cache memories, updating its block frames as the need arises. In accordance with the present invention, a different update strategy is used in which all processors are simultaneously updated with the same data in response to a miss at any one of the cache memories.

The invention may be practiced in any multi-processor having a plurality of processors and a corresponding plurality of caches. A processor requiring a specific target first looks to its cache memory for the target. Upon finding such target in the cache (a hit), the processor fetches the target and acts upon it in accordance with the program. If, however, the target is not in the cache, a block containing the target is fetched from main memory and is written in each and every cache. At the same time, in accordance with the block replacement algorithm used by each cache, another block is deleted from each cache.

The degree of improvement in the efficiency of the multi-processor depends on the extent to which the data fetches are correlated among the various processors. To the extent that the instruction streams are correlated, efficiency is greatly improved because there is substantial likelihood each processor will need the target since all the processors are operating in parallel on a similar instruction stream.

Thus, it is a principal object of the present invention to provide a new and improved system for operating cache memory associated with a processor.

It is also an object of the present invention to provide a method for the simultaneous loading of a plurality of caches with updates.

It is a further object of the present invention to provide data required by a single processor from main memory to that single processor's associated cache, and also to provide such data to additional caches.

It is a still further object of the present invention to provide a new and improved block replacement strategy for cache memory.

BRIEF DESCRIPTION OF THE DRAWINGS

These and other objects, features and advantages of the invention will become more readily apparent from the following detailed description of the invention in which.

DETAILED DESCRIPTION OF THE INVENTION

Figure 1:
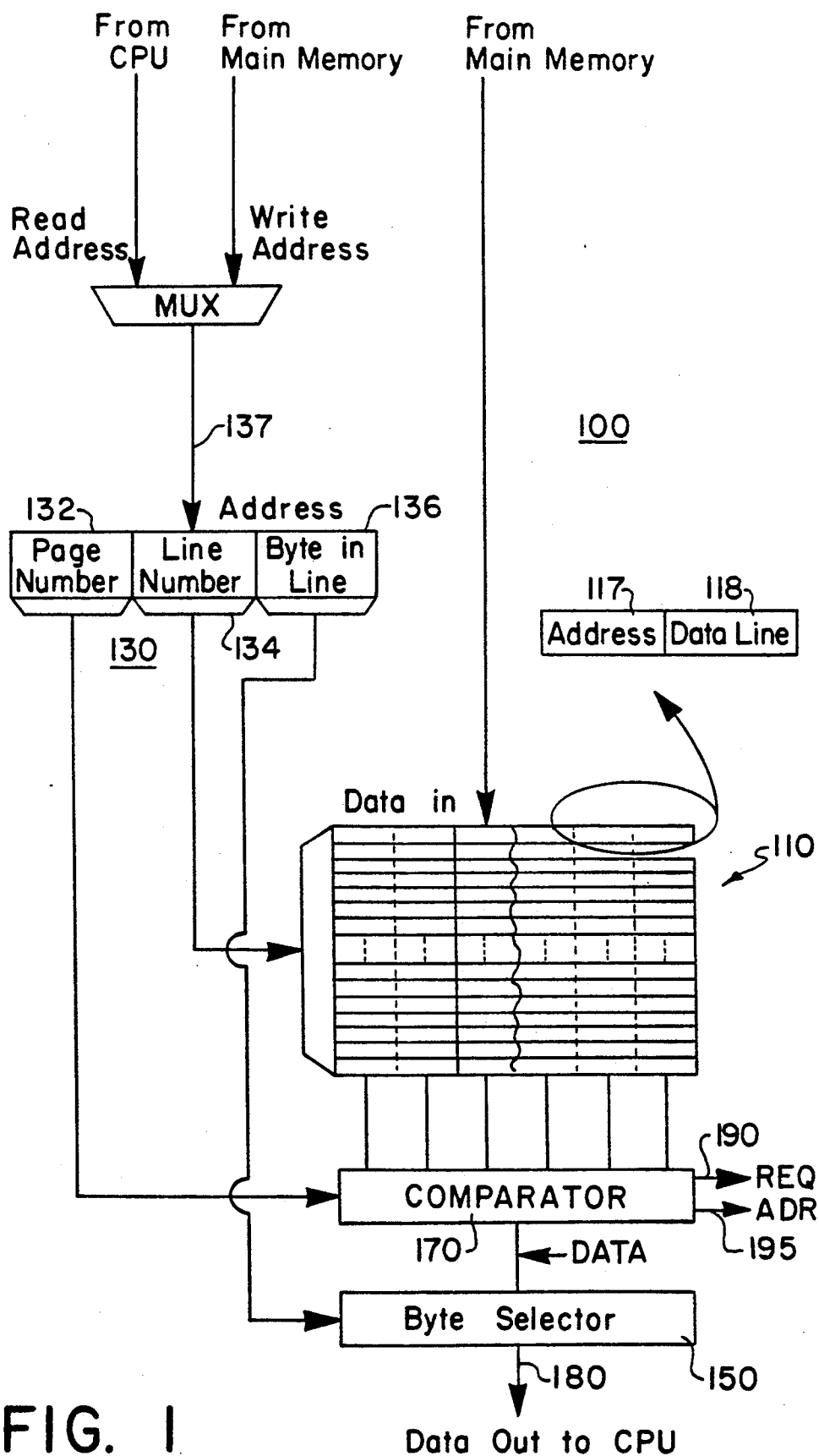
FIG. 1 is a functional block diagram of a prior art cache.

Referring to FIG. 1 there is shown a block diagram adopted from Smith, "Cache Memories", of a known cache system 100 comprising a cache address and data array 110, a byte selector 150 and a comparator 170. Cache address and data array 110 is a high-speed buffer memory which stores the data found in several different blocks of main memory along with the real address of each such block. Each entry in cache 110 comprises a real address tag 117 that identifies the data, and a data line of information 118 stored at that address.

In operation of the known cache system of FIG. 1, the CPU will request data, e.g. an instruction and/or operand, from the cache memory 100 by transmitting to the cache memory the read address of such data by way of line 137. Alternatively, the main memory may transmit a write address of data which it desires to write to cache memory 110. Illustratively, as shown in FIG. 1, an address 130 which is transmitted from the CPU over line 137 contains data representing a page number 132, a line number 134, and a byte 136. Page number 132 is input to comparator 170. Line number 134 is input to cache address and data array 110 while byte 136 is input to byte selector 150.

Figure 2:
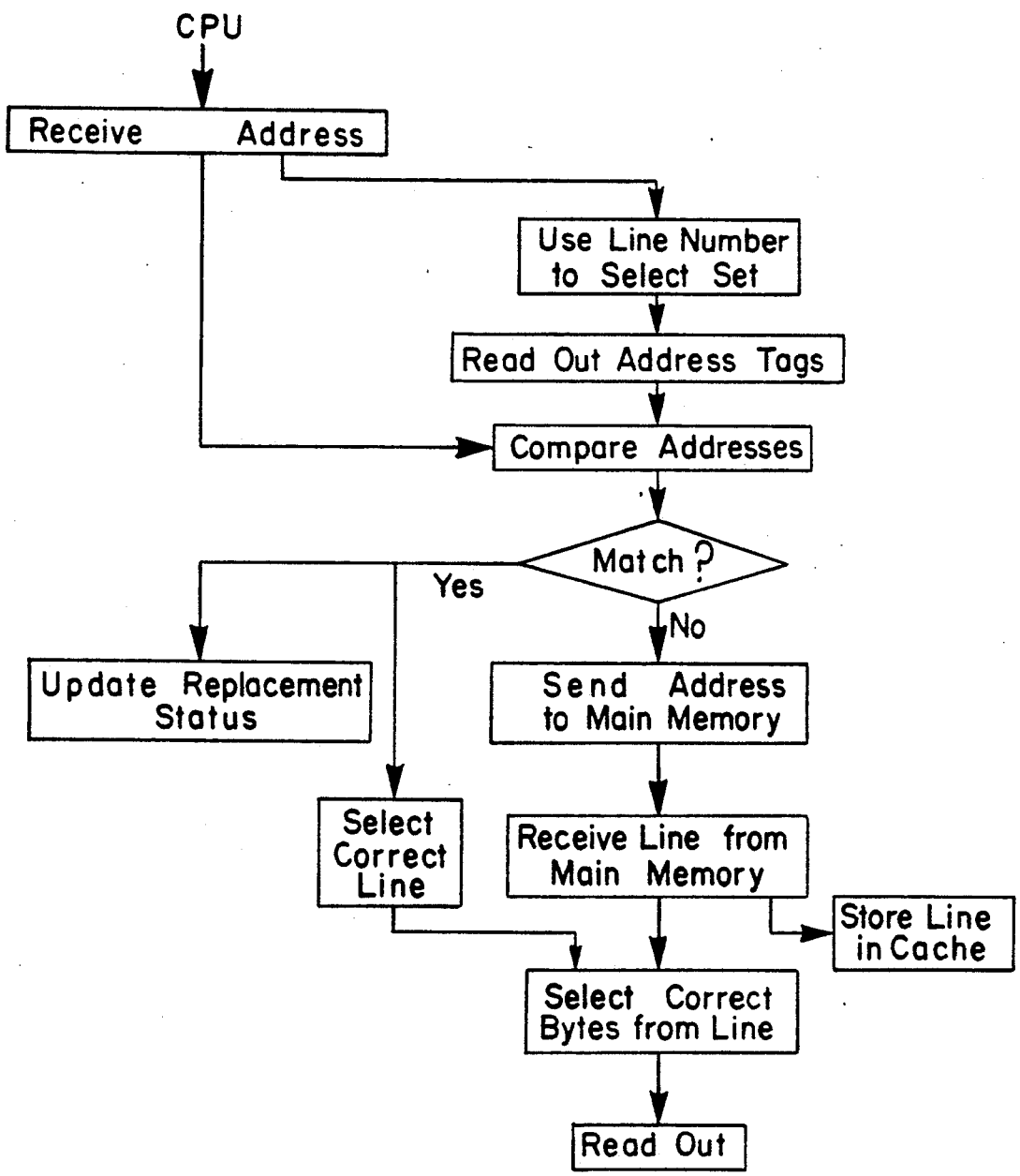
FIG. 2 is a flowchart of a cache operation performed by the cache of FIG. 1.

FIG. 2 is a flowchart of a cache operation performed by the cache of FIG. 1. The cache operation commences with the receipt of an address, generally from the CPU, comprising a page number, a line number and a byte number. Control signals are also provided with the address.

The line number portion of the address is passed initially to the cache address and data array 110 which uses the line number of the address as an index to select a set of entries in cache address and data array 110. Each such entry illustratively comprises a real address tag and a line (or block) of data. The tags corresponding to the selected sets of entries are read into comparator 170 along with the page number of the address which illustratively is provided by the CPU. Upon detection of a match, the line containing the target locations is input to the byte selector, illustratively a shift register. The byte selector is then shifted in accordance with the byte information 136 in address 130 to select the target byte(s) which is subsequently transmitted to the source of the original data request.

If a miss occurs, i.e., if the target line is not in the cache, a request signal is output to signify that a main memory request is required. Such a request signal, REQ, is illustratively output by comparator 170 on line 190. Similarly, the address of the requested line is also output, 195. illustratively by comparator 170 on line Upon receiving a request for a target line, the main memory will provide the target line to the requesting cache within a few machine cycles. Additionally, the line is provided to byte selector 150 for the selection of the target byte(s).

Replacement status information is used to determine which line should be deleted from the cache so as to provide room for the target line. Provisions exist for the situation in which a line to be deleted from the cache has been modified but main memory has not yet received the modification. Such provisions include copying the line back to main memory. If there has been no such modification or if main memory has already received the modification, the line to be deleted is simply deleted from the cache.

Figure 3:
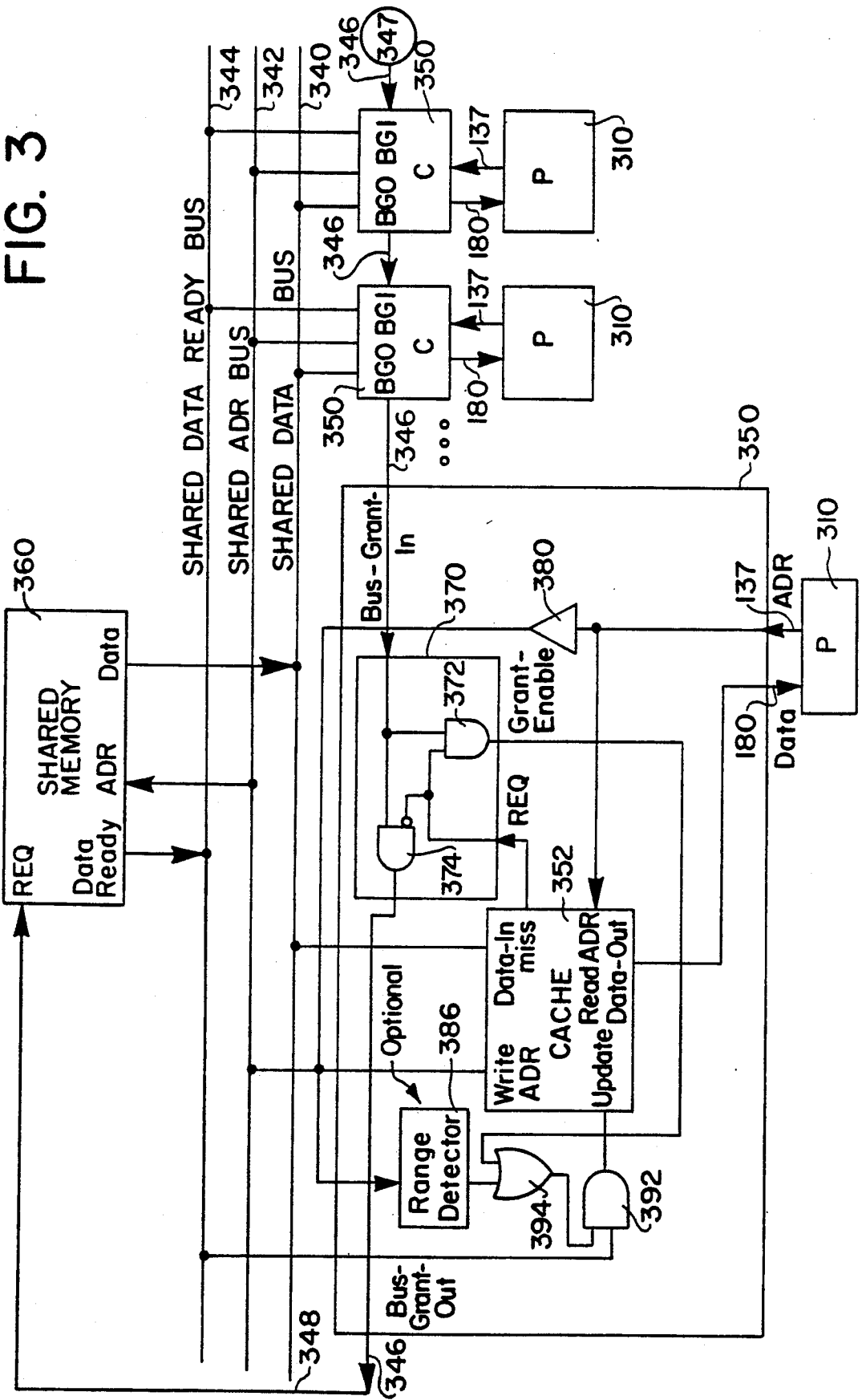
FIG. 3 is functional block diagram of a multiprocessor system having a plurality of caches in accordance with the present invention.

FIG. 3 is a functional block diagram of a multi-processor system 300 having a plurality of caches in accordance with the present invention. The system comprises processors 310, caches 350, and shared main memory 360.

Processors 310 are each connected to their corresponding caches 350 by way of address lines 137 and data lines 180, which correspond to address line 137 and data line 180 in FIG. 1. Each cache 350 is coupled to and shares an address bus 340, a data bus 342 and a data ready bus 344, all of which are also connected to main memory 360. Additionally, each cache 350 is connected to a priority chain 346 to aid in the synchronization of cache update.

Each cache 350 comprises a memory unit 352, a bus arbitration unit 370, a grant enabling gate 380, AND gate 392, OR gate 394 and an optional range detector Cache memory unit 352 functions in the same manner as that of any number of prior art caches, such as that described in FIGS. 1 and 2, and need not be described further. Memory unit 352 is provided with the address of requested data from processor 310 at its Read ADR input via line 137. Cache memory unit 352 will output a miss (or request) signal on its miss line to the bus arbitration circuitry 370 only if the requested data is not in memory unit 352. The request signal is provided via priority chain 346 to a $\overline{REQ}$ input to shared memory 360. The address of the requested update is provided to the shared memory via shared address bus 342. Cache 352 is provided with a memory update via a Write ADR signal from shared address bus 342 and a Data-In input from shared data bus 340.

Bus arbitration among the caches is handled by bus arbitration units 370. Although a number of cache memory units may simultaneously request an update, only one request is granted at a time. Each bus arbitration unit 370 comprises AND gates 372, 374. AND gate 374 is provided with an inverting input REQ and a non-inverting input BUS GRANT-IN (BGI), while AND gate 372 is provided with two non-inverting inputs, namely BUS GRANT-IN and REQ. The output of AND gate 372 is provided on a GRANT-ENABLE line to an enabling input of grant-enabling gate 380. Grant-enabling gate 380 provides an input address from processor 310 to shared address bus 342 when enabled by bus arbitration unit 370.

The GRANT output of AND gate 372 of bus arbitration unit 370 is also provided to OR gate 394, as is a signal from range detector 386. Range detector 386 determines if an address of a memory update on address bus 342 is within a predetermined range of addresses and outputs to OR gate 394 an appropriate signal (e.g., logic high) if it is. The output of OR gate 394 is provided to AND gate 392 so as to enable gate 392 whenever either cache memory unit 352 requires an update (as indicated by GRANT-ENABLE signal from bus arbitration unit 370) or when the address of a memory update on bus 342 is within the predetermined address range (as detected by range detector 386). Range detector 386 is provided if it is desirable to limit the information used to update the cache memory units 352 to information within a specified range of memory addresses. In such a case, whether a cache memory unit would be updated or not would depend on the address of the updating information. For example, if a cache stores a portion of data relating to a certain address range, and has no need for data outside that range, updating that cache with such unnecessary data outside the required range would result in replacing some potentially necessary data with useless unnecessary data.

When cache memory unit 352 outputs a miss signal and provides such to the REQ input of bus arbitration unit 370, a logic high input is applied to the inverting input of AND gate 374 of the bus arbitration unit, resulting in a logic low BUS GRANT-OUT (BGO) signal. This logic low BUS GRANT-OUT signal is input, in a daisy-chain manner, to the BGI input of the next successive cache 350 in priority chain 346, indicating that each successive cache may not perform an update while the present update is being performed. Such a logic low signal is propagated down priority chain 346 to all other caches and input to each AND gate 372, thus disabling each successive grant-enabling gate 380. The output of the last AND gate 374 in the priority chain is applied to the $\overline{REQ}$ input of the shared memory. Thus, the first cache in the priority chain to request an update temporarily disables all other cache's request for update.

Upon receiving a request for update, shared memory 360 obtains the data at the address specified on address bus 342 and outputs a Data Ready signal, the address and the data. The Data Ready signal is provided to shared read/write bus 344 to indicate that the address and the data are available to each cache memory unit 352 for update. Shared data ready bus 344 provides such Data Ready signal to each AND gate 392 while shared address bus 342 and shared data bus 340 provide the address and data to the write ADR and Data-In inputs of each cache memory unit 352. Optionally, the address information is also applied to range detector 386 which determines if the address is within a specified range of addresses of interest to the cache memory. When the address is within the specified range as detected by range detector 386 or when the cache is the source of the request for update, AND gate 392 is enabled; and the Data Ready signal is provided to the Update input of cache memory unit 352. Upon receiving the update signal, each cache memory 352 accepts the address and data signals present at its write ADR and Data-In inputs and stores them in the cache. As a result, when the update is performed, all caches will receive the updated data from main memory limited only by the optional range detector.

Figure 4:
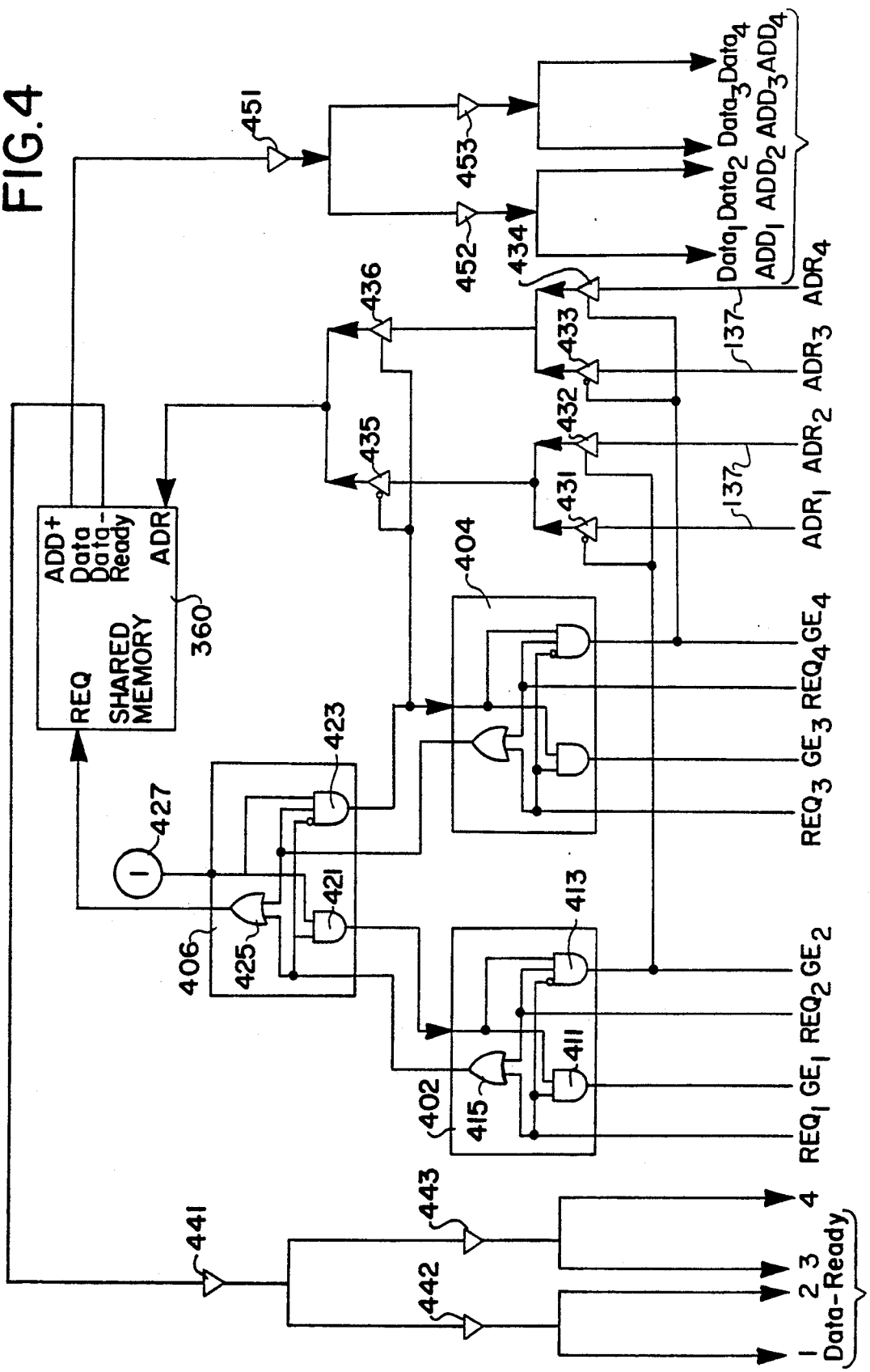
FIG. 4 is a detailed schematic diagram of an alternative bus arbitration circuit.

Referring now to FIG. 4, there is depicted an alternative to bus arbitration circuitry 370 of FIG. 3. The bus arbitration circuit of FIG. 4 is arranged in a hierarchical tree-like configuration and illustratively depicts a system for use with four caches. The teachings of FIG. 4 may easily be expanded and used in conjunction with any number of caches.

Bus arbitration circuitry 400 of FIG. 4 comprises a plurality of modules 402, 404 connected to the caches and a module 406 connected to main memory 360. Each such module connected to the caches receives a request signal REQ from each cache to which it is connected and provides an output GRANT-ENABLE signal GE to each cache. The request signals REQ input to the modules of FIG. 4 correspond to those provided from cache memory unit 352 to bus arbitration unit 370 of FIG. 3 on the miss line. The GRANT-ENABLE signals correspond to those provided by bus arbitration unit 370 to grant-enabling gate 380 and OR gate 394 of FIG. 3.

Each module is identical and comprises an OR gate and two AND gates. For example, module 402 comprises AND gate 411 which provides a GRANT-ENABLE signal $GE_1$ for a first cache and AND gate 413 which provides a GRANT-ENABLE signal $GE_2$ for a second cache. Module 402 receives a request signal $REQ_1$ from a first cache and a request signal $REQ_2$ from a second cache. OR gate 415 of module 402 receives signals $REQ_1$ and $REQ_2$ AND gate 411 receives the $REQ_1$ signal as well as a signal from module 406; and AND gate 413 receives an inverting signal $REQ_1$, a non-inverting signal $REQ_2$ and the signal from module 406.

Module 404 is similar in structure and function to module 402 and receives request signals $REQ_3$ and $REQ_4$ from the respective miss (or request) lines of a third and fourth cache memory units. Similarly, module 404 outputs GRANT-ENABLE signals $GE_3$ for the third cache and $GE_4$ for the fourth cache.

Module 406 likewise comprises an OR gate 425 and two AND gates 421, 423. OR gate 425 provides an output to a REQ input of shared main memory 360. Input 427 of module 406 is supplied with a logic high signal, which is also input to AND gates 421, 423.

Bus arbitration circuitry 400 further comprises grant-enabling gates 431 to 436 which correspond in function to grant-enabling gates 380 of FIG. 3. Grant-enabling gates 431 to 436 permit only one of the processors 310 to provide its address to shared memory 360. The input lines to grant-enabling gates 431, 432, 433, 434 are provided with addresses ADR1, ADR2, ADR3, ADR4, respectively. These are the addresses provided from processors 310 to the grant-enabling gates 380 over lines 137, as shown in FIG. 3. More specifically, grant-enabling gate 431 is input with address $ADR_1$ from the first cache, grant-enabling gate 432 input with address $ADR_2$ from the second cache and so on.

The gates are enabled by GRANT-ENABLE signals from modules 402, 404 with each such signal being connected in complementary fashion to a pair of gates so that one and only one gate in a pair is enabled at any time. The outputs of grant-enabling gates 431, 432 are tied together and input to grant-enabling gate 435; and the outputs of gates 433, 434 are tied together and input to gate 436. Grant-enabling gates 435, 436 are controlled in complementary fashion by a GRANT-ENABLE signal from the output of AND gate 423 of module 406. As a result, one and only one of gates 435, 436 will be enabled to pass an address signal ADR to the ADR input of shared memory 360. As will be appreciated, the complementary enabled, tree-structured grant-enabling gates 431 to 436 permit only one address to be input to main memory when a miss has occurred and one or more caches need to be updated.

Specific operation of a module is as follows. When cache memory unit 352 of a first cache outputs a miss (or request) signal, a logic high input is applied to the inverting input of AND gate 413 of the bus arbitration circuitry of FIG. 4, resulting in a logic low GRANT-ENABLE signal $GE_2$. This logic low signal $GE_2$ is input to the enabling input of the GRANT-ENABLE gate 432 of the second cache, thereby disabling that gate and preventing the second cache from performing an update while the present update is being performed. The logic low signal is also input to the inverting enabling input of grant-enabling gate 431, thus enabling gate 431 and passing address signal $ADR_1$ from the first cache to gate 435. Furthermore, a logic high request signal $REQ_1$ from the first cache will result in a logic high output from OR gate 415; and this, in turn, will produce a logic high input at the output of OR gate 425 which is applied to the REQ input to shared memory 360 indicating that a request is being made to update a cache memory. The logic high output from OR gate 415 will also produce a logic low output from AND gate 423 of module 406. Such a logic low signal is input to the enabling input of grant-enabling gate 436, thereby disabling gate 436 and preventing the third and fourth caches from performing an update. Such a logic low signal is also input to the inverting enabling gate of grant-enabling gate 435, thus enabling gate 435 and permitting main memory 360 to receive address $ADR_1$.

In similar fashion, requests from other caches will be processed by modules 402, 404, 406. If requests for update are received on both input request lines to a module, the circuitry of the modules of FIG. 4 will select the request on the left-hand input line. Other selection procedures could be used if desired. For example, circuits can be provided in which the input line is randomly selected or in which the selected line toggles back and forth so that the left-hand line is first selected, the right-hand line is selected on the next occasion, the left-hand line on the following occasion and so on.

When a request is received at an uppermost module, it initiates the downward propagation of a logic high grant enable signal to the cache memory whose update request has won. AND gates 421, 423 in the uppermost module are enabled by a logic high signal 427. As a result, upon receipt of a request signal at module 406, a logic high signal is transmitted from that module to whichever module 402, 404 was the source of the winning request. In turn, the AND gates of that module function to transmit the logic high grant enable signal to whichever cache was the source of the winning request.

In accordance with the invention, upon receiving a request for update and an accompanying address, shared memory 360 provides that memory address and the data stored at that location in memory to each cache. This is accomplished by fan-out circuitry represented in FIG. 4 by drivers 441, 442, 443 for transmission of a data ready signal and drivers 451, 452, 453 for transmission of the same address and data to each cache.

Specifically, shared memory 360 outputs a Data-Ready signal to driver 441. Driver 441, in turn, provides such Data-Ready signal to each of drivers 442 and 443. Driver 442 outputs the Data-Ready signal on each of Data-Ready lines 1 and 2 while buffer 399 outputs the Data-Ready signal on each of Data-Ready lines 3 and 4. These Data-Ready lines are input to the AND gate 392 associated with each cache 350 as shown in FIG. 3. Shared memory 360 also outputs an address and associated data to driver 451, which provides such address and data to drivers 452, 453. Driver 452 provides such address and data to the write ADR and Data-In inputs of first and second caches while driver 453 provides such data to the write ADR and Data-In inputs of the third and fourth caches.

In the practice of the embodiments depicted in FIGS. 3 and 4, a CPU accesses data from its respective cache by way of an address line. If the cache contains the target data, such data is directly provided to the CPU by the cache over the data line. However, if the target data is not within the cache, the cache outputs a miss (or request) signal to bus arbitration circuitry. The bus arbitration circuitry determines priority among all of the caches. Only one request for update may be granted at a time, but upon granting such request all caches are simultaneously provided with the same data from main memory. Once main memory supplies the requested data to all the caches, the cache which requested the data can then send such data to the requesting processor. It will be evident that if the replacement algorithm is based on data accesses (e.g. the LRU method) then over time different caches may store different data even though they are all updated simultaneously.

Contentions between the parallel update process described above and the normal accessing of the caches by their associated processors may be compensated for by a wide variety of known techniques such as the use of known dual port memories or arbitration schemes and need not be detailed herein.

Thus it can be seen that there is provided a method and apparatus for operating a cache memory in a multi-processor in which a plurality of caches are simultaneously loaded with the same data. Such a system is particularly advantageous in an environment where the processors are operating on similar instruction streams or with similar data.

While the invention has been described in terms of the operation of a read-only cache, it will be appreciated that the invention may be practiced with a variety of known techniques for implementing a cache memory. For example, strategies for providing write coherency in a read/write cache and known methods for pre-fetching sequential accesses can be used in conjunction with the present invention.

In addition, it is to be understood that the invention can be carried out by specifically different equipment and devices and that various modifications, both as to equipment details and operating procedures can be effected without departing from the spirit and scope of the claimed invention. Specifically, any type of bus arbitration system awarding priority to only a single requesting cache may be utilized in place of the systems of FIGS. 3 and 4. Of particular interest, the present invention may be used with packet switching networks such as those described in "Method and Apparatus for Routing MEssage Packets", Ser. No. 043,126, filed Apr. 27, 1987, which have provisions for combining packets according to specified criteria. Alternatively, a hierarchical cache/bus shared memory system such as that described in the above-referenced Wilson paper may be used. Additionally, split caches in which data and instructions are stored separately as well as real or virtual address caches may be used in the present invention.

What is claimed is:

1. A method of operating a multiprocessor computer system having a plurality of cache memories and a common memory which supplies data to said cache memories, each processor having a cache memory associated therewith, said method comprising the steps of:
    accessing a first cache memory from a first processor in order to determine whether referenced data exists in said first cache memory;
    reading said referenced data from said first cache memory upon determining that said referenced data exists in said first cache memory; and
    upon determining that said referenced data does not exist in said first cache memory, updating each cache memory of said plurality of cache memories with an identical block of data obtained from said common memory.

2. The method of claim 1 wherein said updating comprises replacing a block of data in each said cache memory with said identical block of data from a common memory.

3. The method of claim 2 wherein said replacing is accomplished by a least recently used (LRU) method.

4. In a parallel processing computer of the type having a plurality of cache memories, each cache memory associated with one of such processing units, and a common memory associated with said plurality of processing units wherein when a cache memory is tested for referenced data required by an associated processing unit it is updated with a new block of data from said common memory upon determining that said referenced data is not in said cache memory, a method of updating said cache memories comprising the steps of:
    testing a cache memory for the presence of data to be used in an associated processing unit;
    in the absence of such data in said cache memory, requesting such data from common memory; and
    in response to such request, updating each of said cache memories with an identical block of data obtained from said common memory.

5. The computer of claim 4 wherein said updating step comprises reading data instructions.

6. The computer of claim 4 wherein said updating step comprises simultaneously reading said new block of data into each of said cache memories.

7. A computer comprising:
    an array of processors operating in parallel with each other;
    a common memory operatively associated with said array of processors;
    an array of cache memories, each cache memory operatively associated with one processor within said array of processors, said cache memory providing a miss signal upon the occurrence of miss,
    means responsive to said miss signal from one cache memory for updating each said cache memory with an identical block of data from said common memory by causing said block of data from common memory to be written to each said cache memory.

8. The computer of claim 7 wherein said data is instructions.

9. The computer of claim 7 wherein said means for updating each said cache memory comprises a shared data bus.

10. A method of operating a multi-processor computer system having a plurality of cache memories and a common memory which supplies data to said cache memories, each processor having a cache memory associated therewith, said method comprising the steps of:
    accessing a first cache memory from a first processor in order to determine whether referenced data exists in said first cache memory;
    reading said referenced data from said first cache memory upon determining that said referenced data exists in said first cache memory; and
    upon determining that said referenced data does not exist in said first cache memory, supplying to each cache memory an identical block of data obtained from said common memory, said block of data providing the referenced data that did not exist in the first cache memory.

11. The method of claim 10 further comprising the step of selectively updating each cache memory to which said identical block of data is supplied depending on address information associated with said block of data.

12. In a parallel processing computer of the type having a plurality of processing units operating in parallel, a plurality of cache memories, each cache memory associated with one of such processing units, and a common memory associated with said plurality of processing units wherein when a cache memory is tested for data required by an associated processing unit it is updated with a new block of data from said common memory upon determining that said data is not in said cache memory, a method of updating said cache memories comprising the steps of:
    testing a cache memory for the presence of data to be used in an associated processing unit;
    in the absence of such data in said cache memory, requesting such data from common memory; and
    in response to such request, supplying to each cache memory an identical block of data obtained from said common memory, said block of data providing the data that was absent from the cache memory that was tested.

13. The method of claim 12 further comprising the step of selectively updating each cache memory to which said identical block of data is supplied depending on address information associated with said block of data.

14. A computer comprising:
an array of processors operating in parallel with each other;
a common memory operatively associated with said array of processors;
an array of cache memories, each cache memory operatively associated with one processor within said array of processors, said cache memory providing a miss signal upon the occurrence of a miss; and
means responsive to said miss signal from one cache memory for supplying to each cache memory an identical block of data from said common memory, said block of data providing data absent from the cache memory which provided the miss signal.

15. The apparatus of claim 14 further comprising means associated with each cache memory for selectively updating that cache memory depending on address information associated with said block of data.

* * * * *